United States Patent
Numazaki et al.

(10) Patent No.: US 6,628,335 B1
(45) Date of Patent: Sep. 30, 2003

(54) IMAGE CAPTURE MODULE AND IMAGE CAPTURE APPARATUS FOR INPUTTING SHAPE OF OBJECT ON THREE DIMENSIONAL SPACE

(75) Inventors: Shunichi Numazaki, Kanagawa-ken (JP); Takahiro Murata, Kanagawa-ken (JP); Miwako Doi, Kanagawa-ken (JP); Akira Morishita, Tokyo (JP); Naoko Umeki, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/146,957

(22) Filed: Sep. 4, 1998

(30) Foreign Application Priority Data

Sep. 5, 1997 (JP) ............................................ P9-240692

(51) Int. Cl.[7] .............................................. H04N 5/222
(52) U.S. Cl. ...................................................... 348/370
(58) Field of Search ................................. 348/370, 342, 348/340, 236

(56) References Cited

U.S. PATENT DOCUMENTS

| 3,375,752 | A | * | 4/1968 | Fairbanks et al. ............ 355/70 |
| 4,681,432 | A | * | 7/1987 | Kawabata et al. ....... 250/214 B |
| 5,457,492 | A | * | 10/1995 | Sasaki et al. ............... 348/126 |
| 5,801,763 | A | * | 9/1998 | Suzuki ....................... 340/439 |
| 6,091,453 | A | * | 7/2000 | Coan et al. .............. 248/187.1 |

FOREIGN PATENT DOCUMENTS

| JP | 62-052631 | 3/1987 |
| JP | 5-70075 | 9/1993 |
| JP | 07-141101 | 6/1995 |
| JP | 08-340479 | 12/1996 |
| JP | 9-128141 | 5/1997 |
| JP | 09-265346 | 10/1997 |
| JP | 10-177449 | 6/1998 |

OTHER PUBLICATIONS

Official Action.

* cited by examiner

Primary Examiner—Andrew Christensen
Assistant Examiner—Eric Wisdahl
(74) Attorney, Agent, or Firm—Oblon, Spivak, McClelland, Maier & Neustadt, P.C.

(57) ABSTRACT

An image capture module and an image capture apparatus for inputting shape of an object in three dimensional space, including a light emitting section which emits light to the object for reflection by the object and imaging of reflected light on a photo-receiving plane of a reflected light image detecting section via an image capture optical system. The reflected light image detecting section detects a reflected light image indicative of a distribution of intensity of the reflected light. The light may be irradiated evenly to the object and the shape of the object may be detected correctly even if the object has irregularity by disposing the light emitting section closely to the image capture optical system. The object may be illuminated evenly by the light from a light emitting section having plural light emitting elements by disposing the light emitting elements symmetrically about the image capture optical system. The object may be illuminated more evenly by the light from the light emitting elements by using reflecting elements which surround respective light emitting elements and focus light toward the object.

26 Claims, 11 Drawing Sheets

IMAGE CAPTURE MODULE AND IMAGE CAPTURE APPARATUS FOR INPUTTING SHAPE OF OBJECT ON THREE DIMENSIONAL SPACE

BACKGROUND OF THE INVENTION

1. Field of the Invention

The present invention relates to an image capture module and an image capture apparatus including light emitting sections to input a shape of an object on a three dimensional space.

2. Discussion of the Background

Although a mouse is usually used as an input device of a computer, the mouse is a two-dimensional pointing device for moving a cursor, for selecting a menu and the like. The mouse operates on two-dimensional information so that it is difficult to make a selection on an object having a depth such as an object within a three-dimensional space. It has been also difficult to add mouse driven natural motion to characters in creating animation.

In order to solve the above-mentioned problems, the present inventors have invented a device that allows a shape of an object, motion, distance information and the like to be inputted in non-contact mode of operation. This device obtains an image of reflected light by operating in synchronism with light emitting sections an image capture sensor having two capacitors in a photo-receiving cell that corresponds to one pixel. Electric charge generated by a photo-electric converting section of the photo-receiving cell by receiving the light is accumulated selectively in either one of the two capacitors. Then, electric charge generated by receiving light while the light emitting section emits light is accumulated in the first capacitor and electric charge generated by receiving light while the light emitting section does not emit light is accumulated in the second capacitor. Image data of only reflected light which is a difference between the quantities of electric charge of the two capacitors may be obtained by providing a mechanism for outputting the difference between the two quantities of electric charge in reading the charge from the cell.

SUMMARY OF THE INVENTION

The present invention provides an image capture module for inputting a shape of an object on a three-dimensional space, including a light emitting section configured to irradiate light to the object to be imaged; and image capture section, disposed in the vicinity of the light emitting section, configured to detect the light emitted by the emitting device and reflected by the object.

In the image capture module, the light emitting section is disposed in the vicinity of and around the image capture section so as to be geometrically symmetrical. The light emitting section is disposed at positions where the light irradiated from the light emitting section does not directly enter the image capture section.

The image capture module further includes a reflecting device, mounted around the light emitting section, and configured to irradiate light emitted from the light emitting section in an object image capture range. The light emitting section has a directivity that illuminates a range wider than the image capture range and illuminates more brightly the peripheral part of the image capture range than the center of the image capture range.

The image capture module further includes a filtering device, mounted in front of the light emitting section or the image capture section, for protecting the light emitting section or the image capture section. The filtering device selectivity passes a wavelength of light to be inputted.

The image capture module further includes a casing for concealing and storing the whole of the light emitting section and the image capture section. The casing has a connector for exchanging signals with an internal circuit of the image capture section.

The image capture module further includes a rotary shaft, mounted to the image capture module, for rotatably moving the image capture module. The connector is disposed near the rotary shaft.

The present invention is also directed to an image capture section configured to input to a shape of an object on a three-dimensional space, including an image capture module, containing a light emitting section configured to irradiate light to an object to be imaged; and an image capture section, disposed in the vicinity of the light emitting section, configured to detect the light emitted from the light emitting section and reflected by the object, and a mechanism configured to move the image capture module within predetermined range of an angle of elevation.

The image capture apparatus further includes handles, attached to the image capture module, configured to move the image capture module, and a casing configured to conceal and store an external circuit of the image capture module.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF PREFERRED EMBODIMENTS

The fundamental principle and the basic structure of an image capture section according to the present invention is first explained. The image capture section has a light emitting section configured to emit invisible light to an object and an image capture section configured to detect the light reflected from the object. The image capture device detects only the light emitted by the light emitting section and reflected by the object and to the end separates reflected light from external light such as room light or sun light by operating the light emitting section and the image capture section in synchronism.

Figure 1:
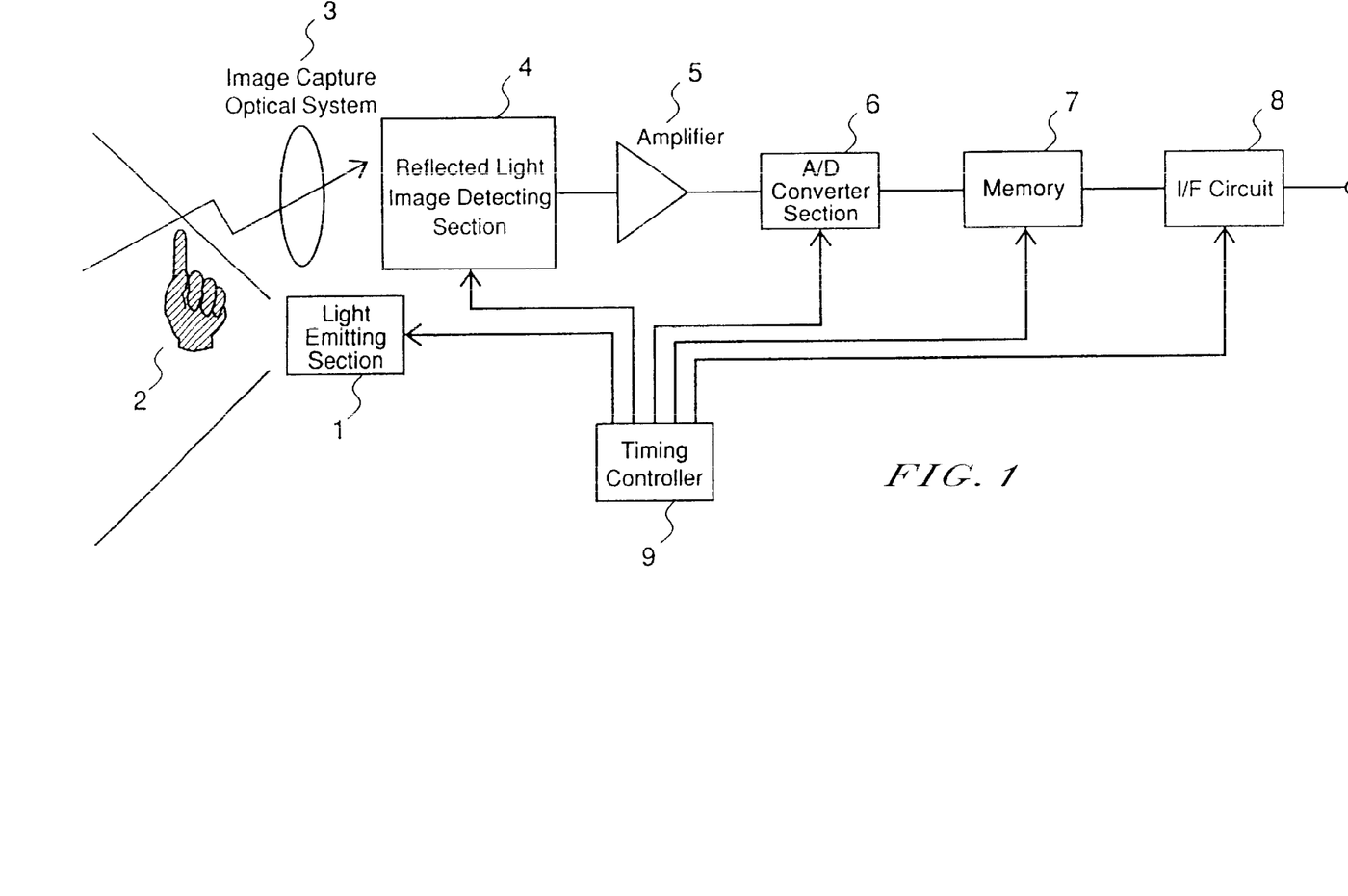
FIG. 1 is a block diagram showing a structure of an inputting device having a light emitting section and image capture sensor according to the present invention.
Figure 2:
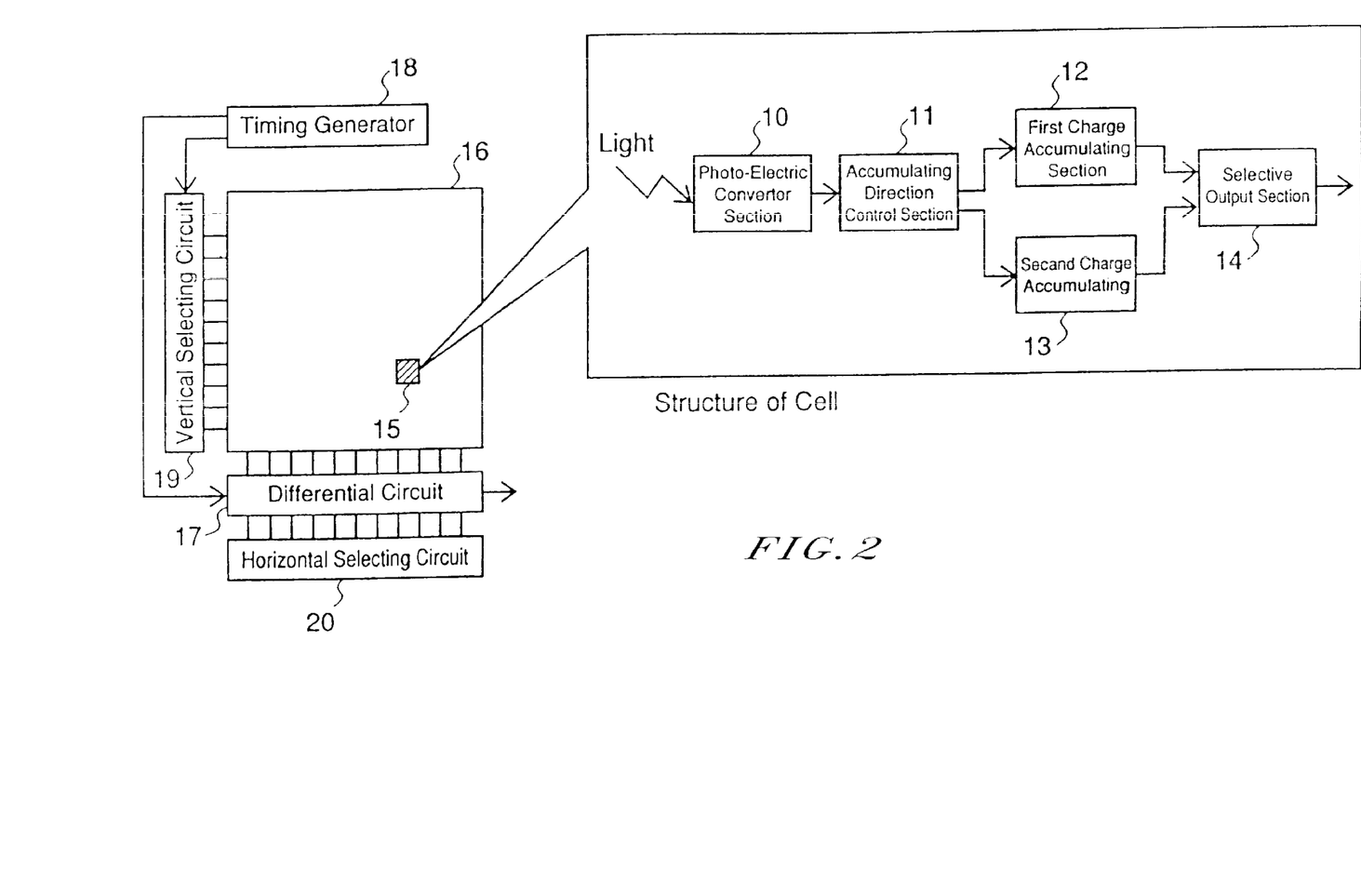
FIG. 2 is a schematic block diagram showing a reflected light image detecting section of the present invention.

Referring now to the drawings, wherein like reference numerals designate identical or corresponding parts throughout the several views, FIG. 1 shows the basic structure of the inventive image capture section and FIG. 2 shows a more detailed structure of a reflected light image detecting section 4 in the image capture section. The light emitted from the light emitting section 1 is reflected by the object 2, e.g., a hand, and the reflected light of the object 2 is imaged on a photo-receiving plane of the reflected light image detecting section 4 via an image-capture optical system 3, e.g., a lens. The reflected light image detecting section 4 detects a reflected light image indicative of a distribution of intensity of the reflected light. How to take out only the reflected light by the reflected light image detecting section 4 separately from the external light is hereinafter described.

The reflected light image detecting section 4 continuously outputs a quantity of reflected light of each pixel of the reflected light image. The output from the reflected light image detecting section 4 is amplified by an amplifier 5, is converted to digital data by an A/D converter section 6 and is then stored in a memory 7. The data stored in the memory 7 is read at predetermined timing. The read data is sent to a computer via an I/F circuit 8 to be processed. A timing controller section 9 controls operation of the image detecting section 4, AID converter section 6, memory 7 and I/F circuit 8.

Next, the structure of the reflected light image detecting section 4 will be explained in detail by using FIG. 2. In the reflected light image detecting section 4, photo-receiving cells 15, each corresponds to one pixel of an image, are arrayed two-dimensionally. Although it is similar to other image-capture elements such as a CCD image sensor in that respect, it is different from the CCD in that it includes a mechanism configured to separate reflected light from the external light and take out only reflected light within the structure of the cell. The cell 15 includes a photo-electric converter section 10, an accumulating direction control section 11, a first charge accumulating section 12, a second charge accumulating section 13 and a selective output section 14.

The photo-electric converter section 10 converts incident light into electric charge. The first and second charge accumulating sections 12 and 13 accumulate the electric charge generated by the photo-electric converter section 10. The accumulating direction control section 11 controls to which of the first and second charge accumulating sections 12 and 13 the electric charge generated by the photo-electric converter section 10 should be accumulated. The selective output section 14 selects either the first charge accumulating section 12 or the second charge accumulating section 13 and reads its electric charge to the outside of the cell.

The following operation is carried out in order to obtain one reflected light image. At first, the light emitting section 1 emits light in pulses. During the emission, electric charge generated by the photo-electric converter section 10 is accumulated in the first charge accumulating section 12. Then, while the light emitting section I is not emit light, electric charge generated by the photo-electric converter section 10 is accumulated in the second charge accumulating section 13.

That is, the electric charge obtained by receiving the reflected light and the external light such as room light and sun light is accumulated in the first charge accumulating section 12 and the electric charge obtained by receiving only the external light is accumulated in the second charge accumulating section 13. When the electric charge is to be read from the cell, the two quantities of accumulated electric charge are read sequentially to take out a difference there between by a differential circuit 17. Only the reflected light may be taken out by subtracting the quantity of accumulated electric charge of the second charge accumulating section 13 is from the quantity of accumulated electric charge of the first charge accumulating section 12.

The relationship between positions of the light emitting section and the image capture section is important for the image capture section of the present invention. When there are objects at the same distance, it is desirable to be able to illuminate the surfaces of the objects equally. In other words, it is then desirable that the intensity of illumination be equal.

Further, the photo-receiving cells 15 may be a CCD image sensor. In this case, the CCD image sensor is controlled to output alternately electric charge generated by receiving light while the light emitting section emits and does not emit.

First Embodiment

Figure 3:
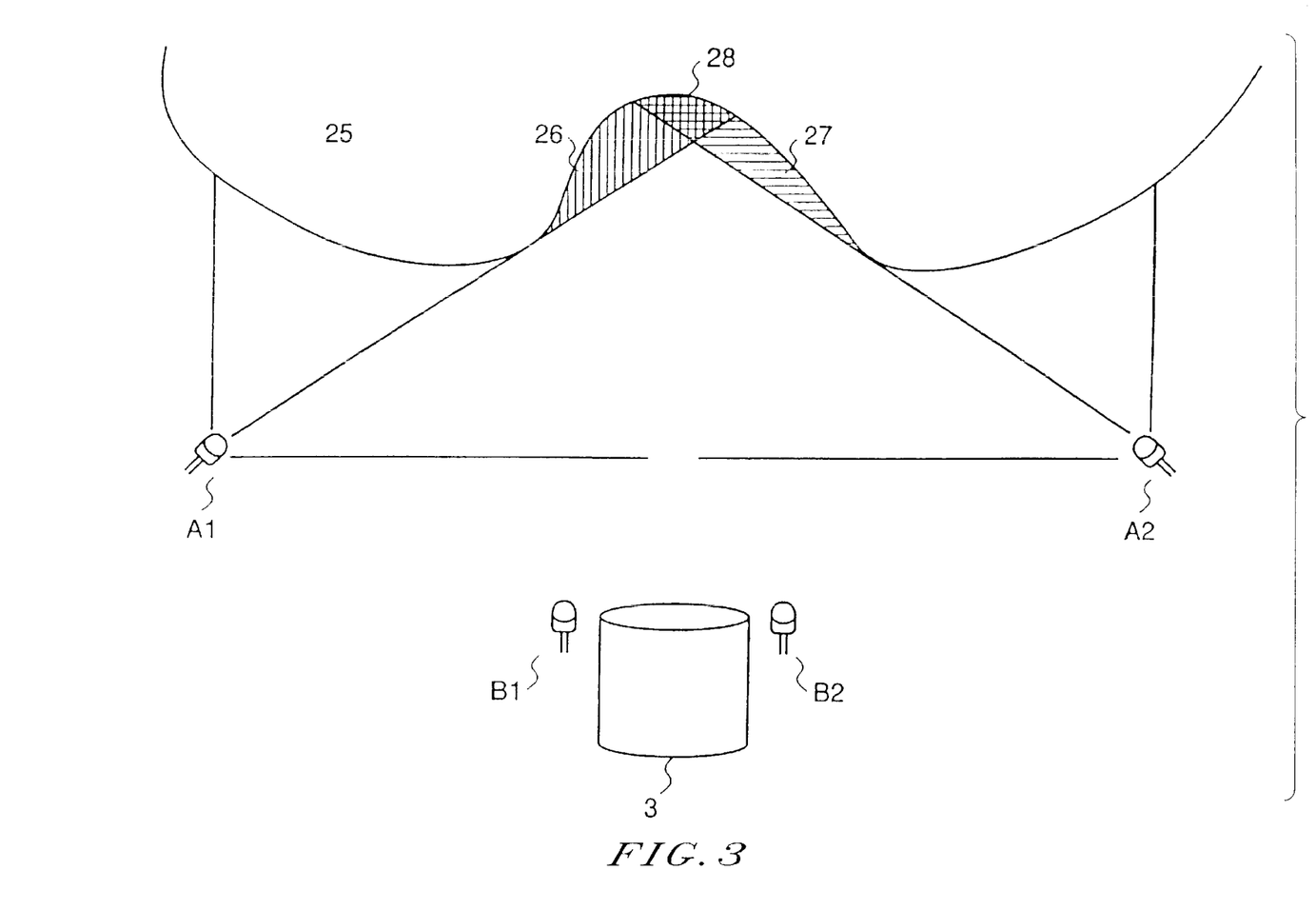
FIG. 3 is a diagram illustrating an effect of the relationship between positions of the light emitting sections and the image capture optical system of the invention.

In FIG. 3, reflected light from an object 25 is detected by an image capture element (not shown) via the image capture optical system 3. Assume that there are two light emitting sections at positions Al and A2. An LED is used as a light emitting element in each light emitting section.

When the object 25 has a concave shape in which the center thereof is dented, there is a portion 26 at the dented part where the light emitting from the light emitting section Al does not reach. Similarly, there is a portion 27 where the light emitting from the light emitting section A2 does not reach. The illuminance of these portions is low because only the light of one light emitting section strikes as compared to the other part where the light from both of the light emitting sections strike. Accordingly, a part in the reflected light image corresponding to that portion becomes dark.

Further, light from neither of the light emitting sections A1 and A2 reaches a portion 28 and no reflected light returns to photo-receiving cells from the portion 28 at all. Therefore, the reflected light image appears as if it has a hole at the center.

When the light emitting sections are located at positions B1 and B2, not at the positions A1 and A2, light reaches also to the concave portion at the center of the object 25, so that such a problem do not arise.

The same applies also to a case when an object has a convex shape whose center protrudes. Because light of only one light source reaches the outer slant portions, the illuminance there drops with the result that such portions are darkened relative to the other portions. To avoid the occurrence of darkened portions, it is important the all of points on an object to be picked up be coupled in a straight line to the light source and not be obstructed by the other part of the same object.

To that end, it is preferable to dispose light emitting sections as close as possible to the image capture optical system. This is important for the device emitting light from the light source, detecting its reflected light as an image and processing each pixel value of the image in connection with distance as described in the present embodiment.

Figure 4A:
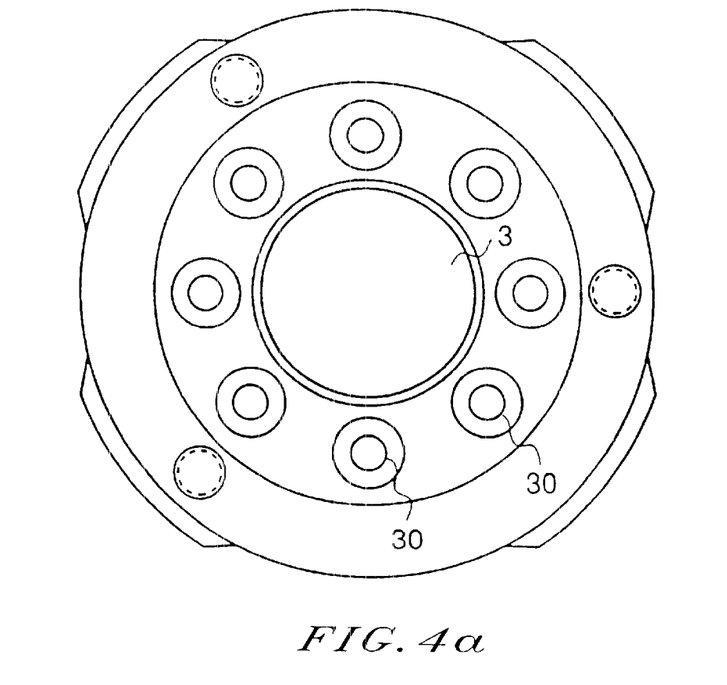
FIGS. 4a and 4b are plan and sectional views showing a structure of the image capture module of the present invention.
Figure 4B:
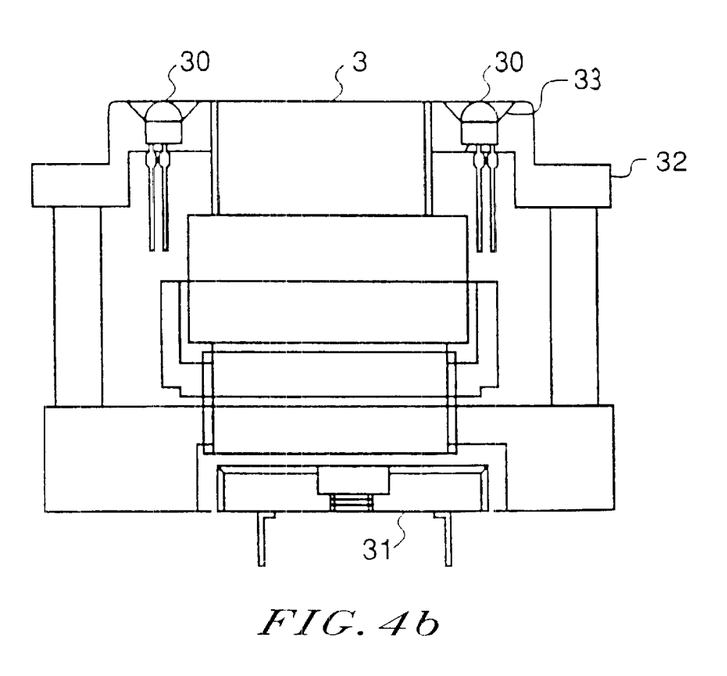

FIGS. 4a and 4b show the image capture module constructed by disposing the light emitting sections close to the image capture optical system, wherein FIG. 4a is a plan view in which the image capture module is seen from the top (from the object side) and FIG. 4b is a sectional view when the image capture module is seen just from the side.

The image capture module shown in FIG. 4a includes the image capture optical system 3 at the center and eight light emitting sections on a concentric circle around that. Here, the light emitting sections are composed of LEDs 30.

In FIG. 4b, the image capture optical system 3 is located at the center and is surrounded by the LEDs 30. The image capture element is located below the image capture optical system 3. Covering the image capture module is part of a frame or a casing 32 for fixing the relationship of positions of the LEDs 30 and the image capture optical system 3.

In the first embodiment, an angle of view of the image capture optical system 3 is set large for the reason explained hereinafter. Because the image capture section forms an image by detecting light emitted from the light emitting sections and reflected by the object, the further the distance to the object, the smaller the quantity of reflected light to be received becomes. The distance to the object is desirable to be short for higher S/N. However, the shorter the distance, the narrower a range where an image can be detected becomes.

Suppose that a gesture inputting apparatus is to be constructed by utilizing the inventive device to input and analyze a shape of hand, for example. In such a case, the image-capture range must be sufficient to include the whole hand and to allow a certain degree of the hand movement. In particular, the image capture range must be at least 30 cm square. A diagonal distance of the image capture range of 30 cm square is about 42 cm. When it is realized by using an optical system having about 50 degrees of angle of view, the distance to the object is around 45 cm. When it is realized by an optical system whose angle of view is about 70 degrees, the distance to the object is around 30 cm.

Because the quantity of received light is inversely proportional to a square of the distance to the object when the quantity of emitted light of the light emitting sections is equal as described above, the quantity of reflected light is reduced by half or less when the distance to the object increases 45 cm from 35 cm. Accordingly, the angle of view of the image capture optical system is desirable set to be large.

Because this image capture section is arranged so as to form an image by receiving the light emitted by the light emitting section and reflected from the object, the light emitted by the light emitting section should not enter the photo-receiving element directly. Accordingly, the light emitting sections should be disposed at positions where the light thereof will not enter the image capture element directly.

As a method for realizing that disposition, the positional relationship between the light emitting sections 30 and the image capture optical system 3 should be defined so that the light will not enter the image capture optical system 3 directly. Otherwise a blocking member that blocks only the direct light without affecting the irradiation of light to the object or the imaging of the reflected light should be provided. The image capture module shown in FIGS. 4a and 4b combines both such structures.

Each LED of the light emitting section shown in FIG. 4b is surrounded by a reflecting element in the form of a sloped recess 33 cut aslant around each LED so that the surface of the sloped recess reflects the light of each LED. Although the LED 30 has a wide directivity and illuminates a range exceeding far beyond the image capture range, the light illuminated beyond the image capture range will not reach the image capture element even if it is reflected by the object. The quantity of reflected light may be increased and the S/N may be approved by directing the light emitted toward the outside of the image capture range within the image capture range by the reflecting element.

Figure 5A:
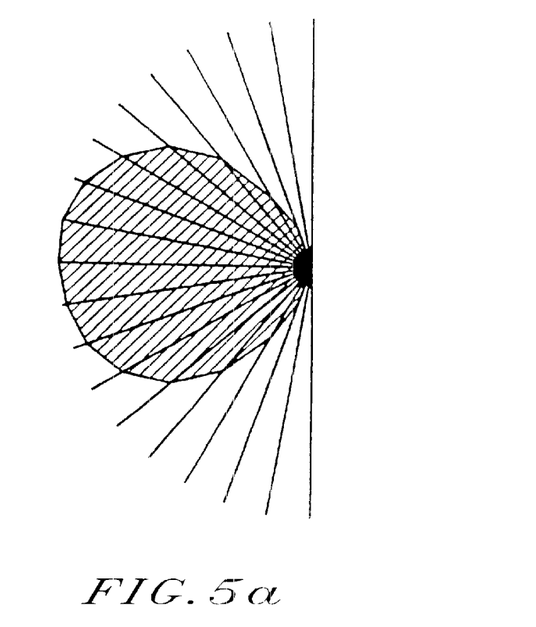
FIGS. 5a and 5b are diagrams illustrating changes in directivity characteristics of the light emitting section obtained by using a reflecting plate according to the present invention.
Figure 5B:
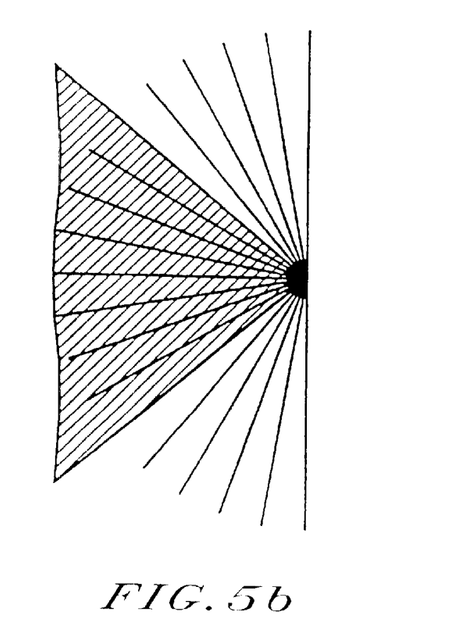

Further, the use of the reflecting element allows the brightness of the peripheral part to be enhanced more than that of the center and to prevent the S/N at the peripheral part from dropping. This point will be explained further in detail in connection with FIG. 5.

The LED is constructed by concealing an LED chip, i.e., a light emitting body, by resin having an effect of lens. Although the LED chip itself emits light in omnidirectionally, various directive characteristics may be given to the LED by changing the lens effect of the concealing resin.

FIG. 5a shows a light emitting directivity characteristic of an LED suitable for the present embodiment. This LED has a wide directivity and is capable of illuminating a wide range. As it is apparent from FIG. 5a, the intensity of emission is gradually reduced as the direction of emission deviates from the front direction and is reduced almost to a half in the direction deviated by 50 degrees from the front direction.

Figure 6:
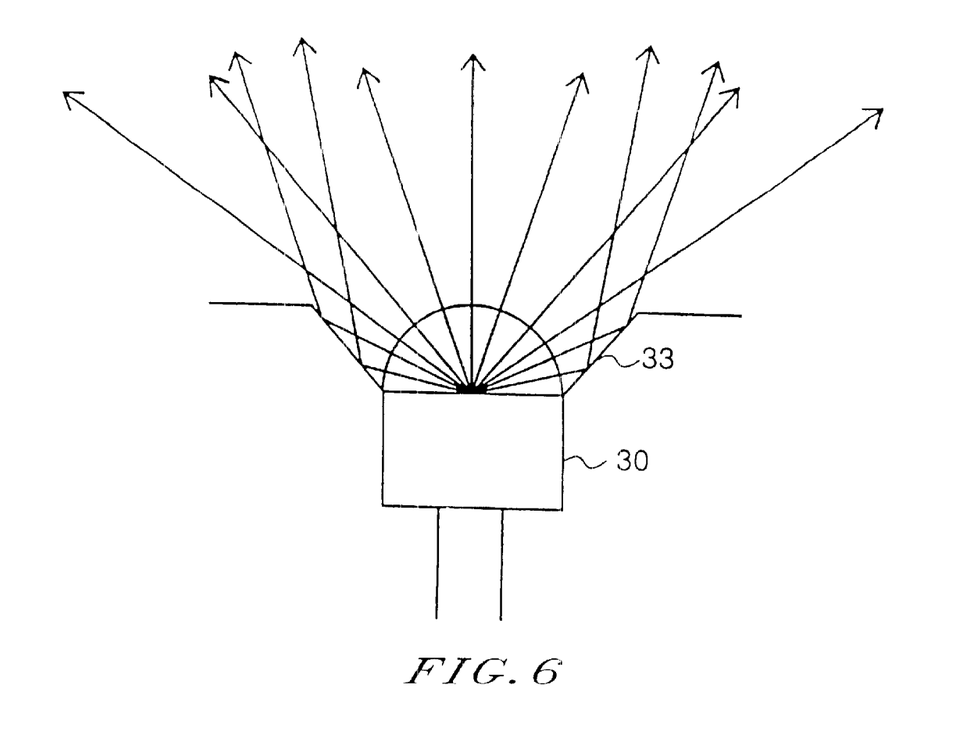
FIG. 6 is an illustration of light reflected by the reflecting plate of the present invention.

Then, the reflecting element 33 is mounted in relation to the LED as shown in FIG. 6. The LED 30 is located at the center of and surrounded by the reflecting element 33. Light emission from the LED is reflected and the directivity thereof is changed by the reflecting element 33. FIG. 5b shows a directive characteristic of the emission which has been changed by utilizing such reflecting element. Here, the reflecting element is disposed so that light emitted at an angle of 40 degrees or more from the front direction is reflected. Thus, the intensity of emission in the peripheral direction becomes greater than that of the front direction.

However, because the LED light emission may not be always directed to the center of the object space. For example, there may be a case when the slope and the shape of the reflecting element are better not to be symmetrical. While the symmetrical slope may be created just by creating a conical hole from the top, an asymmetrical slope may be created by creating a conical hole from the diagonal direction deviated from the orientation of the LED.

For instance, it is desirable to set the angle of the slope on the lens side at 38 degrees and that of the opposite slope at about 35 degrees (both are angles from the direction of the optical axis) when a distance from the center of the lens to the LED is 20 mm and in order to illuminate a space of 20 cm square distance from the lens by 20 cm.

Further, the reflection characteristic of the reflecting element 33 is not limited in specular reflection. Usually, the accuracy of the position of the LED chip is not high and it is not reasonable to mount the LED high-accurately. Then, the reflecting element which has reflection characteristic of specular reflection makes loss of the illuminance for the object space by the error of the position of the LED.

In this case, the surface of the reflecting element may be diffuse reflection surface. In this way, the reflecting light reflected by the reflecting element diffuses any direction. So, the reflecting element of diffuse reflection surface is resolved the loss of the illuminance for the object space by the error of the position of the LED.

The shape of the reflecting element is arranged by a directivity characteristic of an LED, a characteristic of the surface of the reflecting element and the desirable characteristic of the emission. One of the desirable shape of the reflecting element is a shape 63 as, shown in FIG. 7. It is supposed that LED exists a starting point in this graph of FIG. 7. A direction of lengthwise axis the front direction of the LED. This graph shows a right side of a sectional view. The shape of this reflecting element has a characteristic mentioned below.

Figure 7:
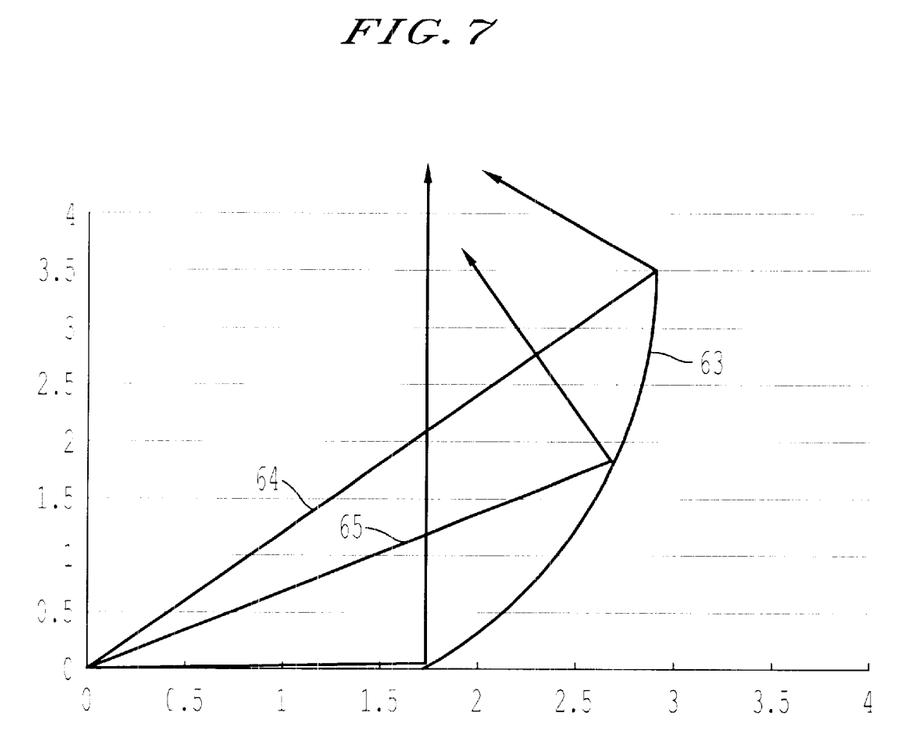
FIG. 7 is an illustration of light reflected by the reflecting plate of the present invention.

A light 64 of the 50 degrees direction from the center is reflected by the vertically reflecting element. And, the light 64 is reflected to the direction 50 degrees. A light 65 of the direction more than 50 degrees from the LED is reflected to the vertical direction according to the degrees increased. A light 66 of the 90 degrees direction from the center is reflected to the vertical direction by the reflecting element of 45 degrees. And, the light 66 is reflected to the vertical direction. The light of the direction which is from 50 degrees to 90 degrees is reflected uniformly to the opposite side which is from 50 degrees to 0 degree.

Because of the LED is a small surface light source which is not a point light source, the reflecting element which has specular reflection of this shape may be loss of the illuminance for the object space by the error of the position and the shape of the LED. So, the surface of the reflecting element has the characteristic of the diffuse reflection. In the case of the specular reflection, the illuminance is bright for the reflected light reflects to the vertical direction from the 90 degrees direction. So, it is desirable that the reflecting element is designed for the reflected light reflects to the direction shifted from 90 degrees.

Figure 8A:
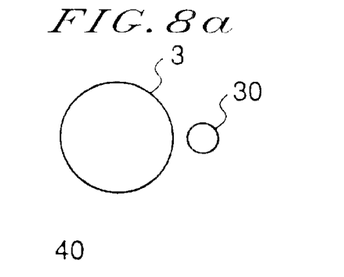
FIGS. 8a–8h are illustrations of various arrangements of the image capture optical system and the light emitting sections of the present invention.
Figure 8B:
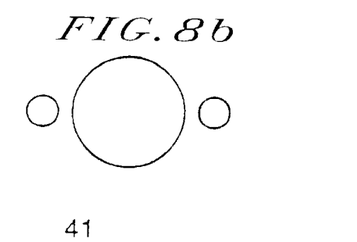
Figure 8C:
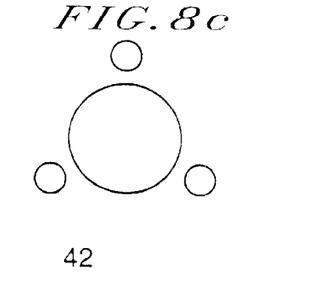
Figure 8D:
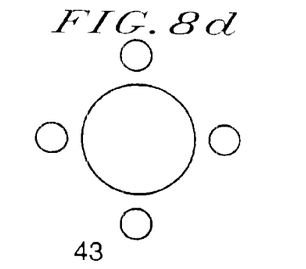
Figure 8E:
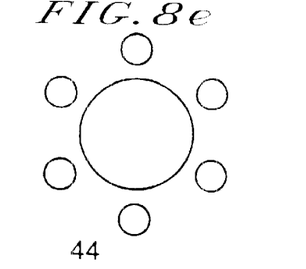
Figure 8F:
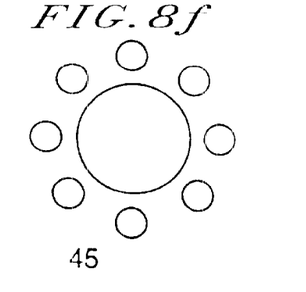

Next, difference possible arrangements of the plurality of LEDs will be explained in relation to FIGS. 8a–8h which show examples of arrangements corresponding to different numbers of LEDs. Generally, the LEDs are arranged symmetrically about the center of the lens, except in the case 40 where only a single LED is provided, as shown in FIG. 8a.

It is desirable to be able to illuminate the space to be detected by uniform light as much as possible. When all of the LEDs are disposed on one side of the lens, the side of the space to be detected as far from the LEDs is darkened as compared to the opposite side.

Although FIGS. 8a–8f show exemplary arrangements 40 through 45 in which 2, 3, 4, 6 and 8 LEDs are used, the number of LEDs of the invention is not limited to those numbers. Although the LEDs cannot be disposed symmetrically except when there is only one LED, it is effective to dispose them closely to the lens.

Figure 8G:
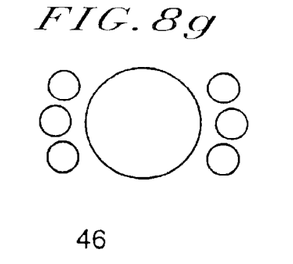
Figure 8H:
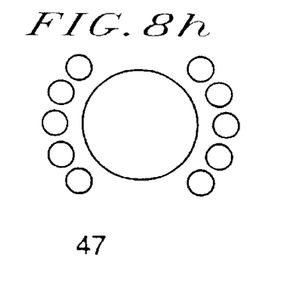

Also, the LEDs may be disposed at the bilaterally symmetrical positions in the examples 46 and 47 shown in FIGS. 8g and 8h, they need not be disposed evenly around the image capture optical system. This arrangement may be adopted when the image capture range is rectangular and is lengthy in the horizontal direction. An advantage of this arrangement is that because the LEDs are mounted at the two places to the right and left, the LEDs may be mounted per group on a small substrate, thus allowing the substrate to be miniaturized and facilitating the packaging.

Second Embodiment

This image capture module allows a device to be manipulated in a non-contact manner when it is not desirable to manipulate the device directly by hand because the hands are dirty for example. However, there has been a possibility that this image capture module may malfunction when exposed in an environment where it is liable to get wet by water or to become dirty by mud for example.

Further, the quality of the detected image deteriorates when foreign substances such as mud and dust are lodged between the image capture optical system and the image capture sensor. Therefore, it is very important for the device that might be used in such an adverse environment to construct the image capture module so that it will not affected by such substances.

Figure 9:
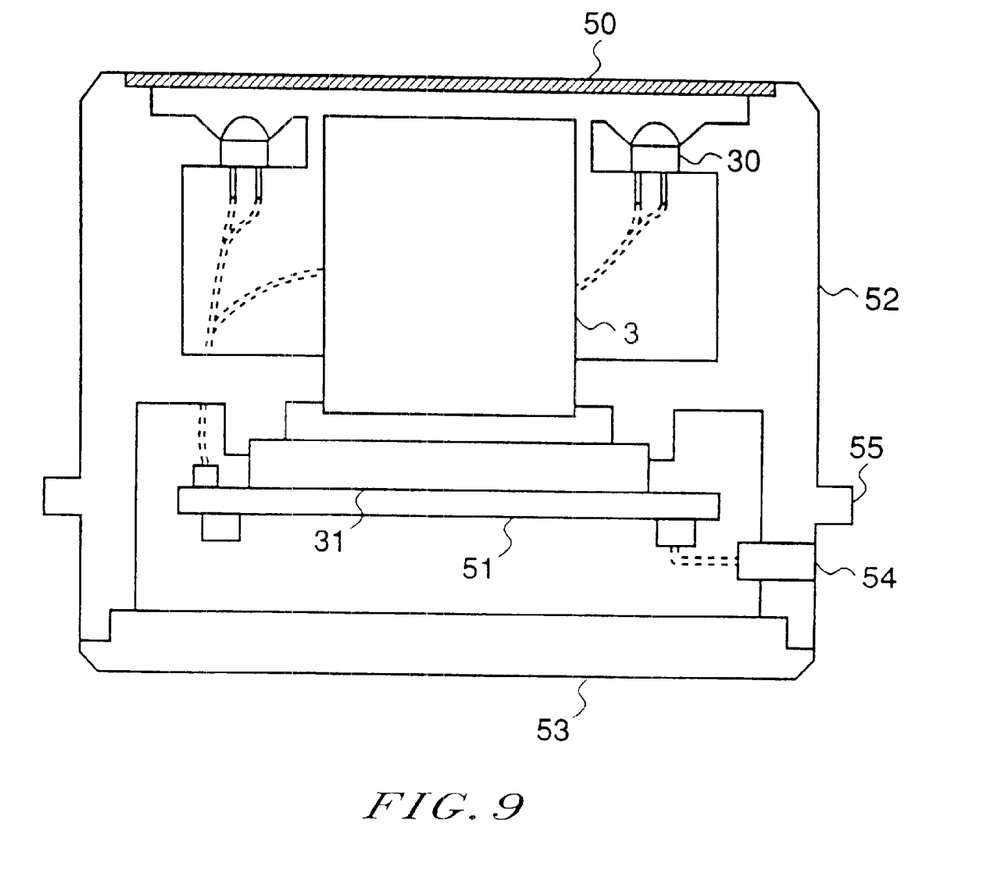
FIG. 9 is a sectional view showing a concealed image capture module of the present invention.

FIG. 9 shows an image capture module having a concealed structure to solve such problems. In FIG. 9, the LEDs 30, i.e., the light emitting section, the image capture optical system 3, the image capture sensor 31 and some circuit parts are stored in a concealed casing 52.

The image capture optical system 3, the LEDs 30 and the image capture element 31 mounted on a substrate 51 as well as their positional relationship are fixed by the casing 52. A peripheral circuit is mounted on the substrate 51 as necessary. Cables for emitting the LEDs are led out of the substrate.

Preferably, the upper part thereof is covered by an optical filter 50 which selectively transmits light of wavelength to be received to form an image. Because near infrared rays are used in the present embodiment, a near infrared ray transmission filter is used here. This filter will not transmit visible light, so that the user is unable to see the inside beyond the filter.

The image capture optical system, the substrate on which the image capture element is mounted, and the LEDs are concealed by the casings 52 and 53 as well as the optical filter 50.

It is advantageous to use the optical filter also from the following viewpoint. When the near infrared LED is used as the light emitting section, the user cannot see the light. However, in one embodiment a small fluorescent lamp may be used instead of the near infrared LED in order to assure a much larger quantity of light. However, because the user can see the light when the fluorescent lamp is used, a filter for cutting the visible light must be used to prevent the glare.

Meanwhile, an optical filter for filtering out light other than that of predetermined wavelength in order to reduce the amount of external light such as room light and sun light may be used together in the image capture optical system. It is, however, cumbersome to mount the similar optical filters in the light emitting section and the image capture optical system.

Then, it is preferable to dispose the light emitting section and the image capture optical system as close as possible and to cover the front face thereof by the optical filter filtering out light other than that of the predetermined wavelength. The cost may be also lowered by disposing the image capture optical system and the light emitting section closely.

The image capture module includes the image capture sensor, forming an electrical circuit together with several accompanying electronic parts. Therefore, the internal circuit must be connected with the external circuit when the image capture module is concealed. Although it is possible to connect the cables directly with the external circuit, it is preferable to provide a connector 54 for connecting to the outside in order to facilitate the assembly of the image capture module to other equipment.

The image capture section of the present invention may be used as an input device of various equipments. A designer of an equipment with which the inventive image capture section of the present invention is to be assembled can use the device of the present invention as an input device of arbitrary information by arranging the equipment so as to detect the shape of a hand, for example, by the image capture module, to include an image processor to convert the image into data which can be used as controllable information and then to take out only the data to the outside of the connector 54. The equipment can be used in an environmentally hostile application by utilizing a water-proof or anti-dust connector.

Preferably, the image capture section is installed so as to be able to change the image capture direction. When it is used as a device for inputting the shape and the motion of moving hand, for example, the position where the hand can be readily moved differs depending on person. In such a case, it is preferable to arrange the device so that the user can control the image capture direction.

The simplest structure which allows the image capture direction to be controlled is to arrange the image capture module so that it is rotatably mounted on a rotary shaft extending in the direction vertical to the optical axis of the image capture optical system in the present embodiment. In that case, when the connector is mounted at a position distant from the rotary shaft, the position of the connector may largely changes due to the rotation. Then, the cable connecting from the connector to the other circuit must be made longer. In order to avoid this problem, the connector is positioned as close to the rotary shaft as possible. Thereby, the cable connecting the image capture module with the external circuit may be shortened. It also avoids a long cable from becoming entangled with other parts when the image capture module is moved. In FIG. 9, the image capture module is constructed so that the rotary shaft 55 is close to the connector 54.

Third Embodiment

Figure 10:
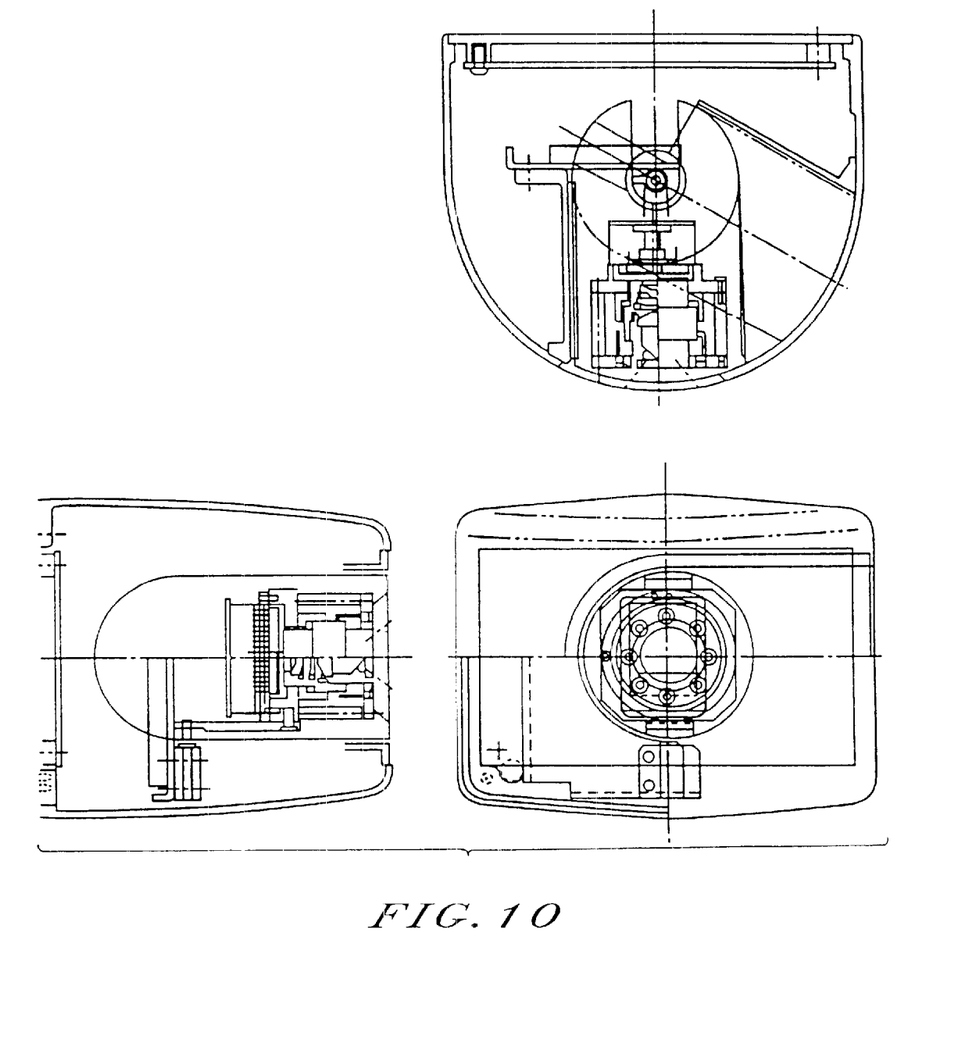
FIG. 10 is an illustration of the image capture apparatus of the present invention in which the image capture module is made movable.

FIG. 10 shows an image capture section arranged such that an angle of deviation of the image capture module can be controlled in a range from 30 degrees to 90 degrees. Because the image capture section allows the image capture direction to be controlled, each user can control its direction.

This device is arranged so that it can be placed on a desk and be manually manipulated by user. Normally, it can be used readily with the user making such manipulation by resting his/her elbow upon the desk. Then, the position of hand may differ depending on the length from the elbow to the tip of the hand. The above-mentioned mechanism can accommodate differences in location of the hand due to the noted user manipulation.

Figure 11:
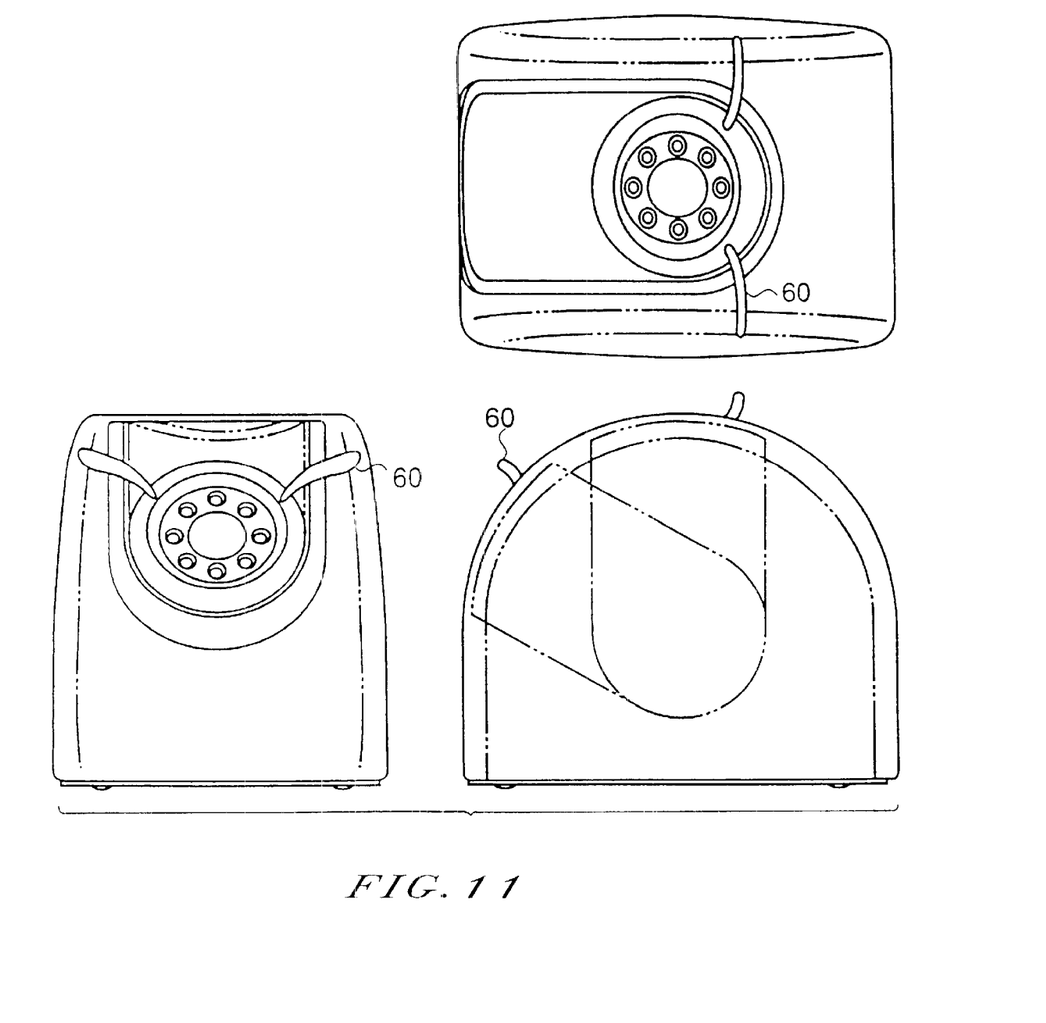
FIG. 11 is an illustration of the image capture apparatus of the present invention having handles for moving the image capture module of the present invention.
Figure 12:
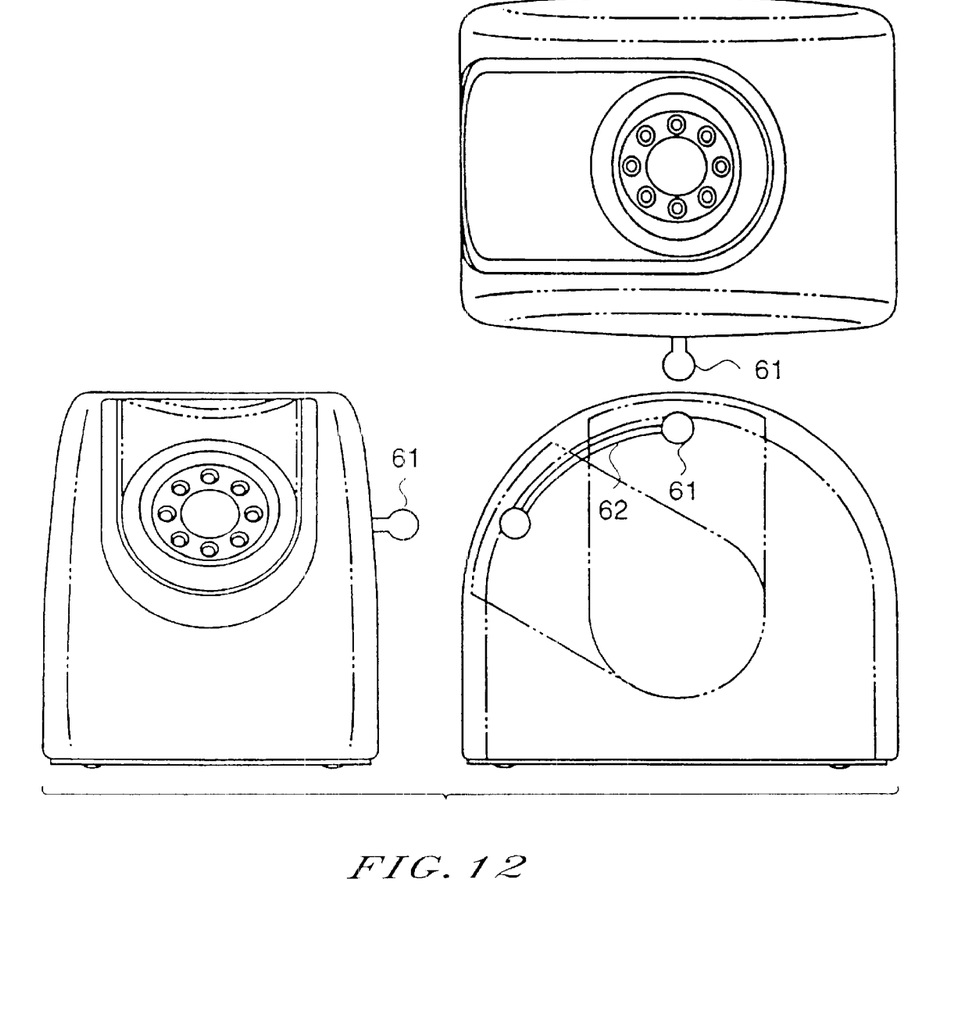
FIG. 12 is an illustration of the image capture apparatus of the present invention having a handle for moving the image capture module of the present invention.

FIGS. 11 and 12 show image capture sections having attached handles 60 and 61 for changing the angle of the image capture module. When one touches the image capture optical system or the optical filter in changing the direction of the image capture section, the contacted part may be stained, thus deteriorating the quality of image detected. Then, the handles are attached so that the user by using the handles need not erroneously touch the image capture optical system or the optical filter.

The handle 60 is attached around the top of the LEDs of the image capture module in FIG. 11. The handle is attached at the position when it will not block the path of the light emitted by the light emitting section, reflected by the object and reaching to the image capture element. The handles are attached on the right and left sides to allow users of both right-hander and left-hander to manipulate the module readily.

FIG. 12 shows a casing when the handle 61 is attached on the side of the main body. The image capture module moves in linkage by sliding the handle along a groove 62. Although the handle is attached only at the right side in the figure, the handle may be attached on the both sides as a matter of course.

Obviously, numerous modifications and variations of the present invention are possible in light of the above teachings. It is therefore to be understood that within the scope of the appended claims, the invention may be practiced than as specifically described herein.

What is new and desired to be secured and protected by U.S. Letters Patent is:

1. An image capture module for inputting a shape of an object on a three-dimensional space, comprising:

a light emitting section configured to irradiate light to the object to be imaged;

an image capturing section disposed in the vicinity of said light emitting section and configured to detect the light emitted by said light emitting section and reflected by said object;

wherein the image capturing section comprises a photoelectric converter section which converts incident light into electric charge, a first charge accumulating section which accumulates the electric charge during a light emission of the light emitting section, a second charge accumulating section which accumulates the electric charge while the light emitting section does not emit the light, and a differential circuit which takes out a difference between the electric charges accumulated in the first and second accumulating sections;

wherein said light emitting section has a directivity that illuminates a range wider than an image capture range and illuminates a peripheral part of the image capture range more brightly than a center of the image capture range, the light emitting section includes an LED chip and a concealing resin, and the directivity is given by changing a lens effect of the concealing resin.

2. The image capture module according to claim 1, wherein said light emitting section is disposed geometrically symmetrically around said image capture section.

3. The image capture module according to claim 1, wherein said light emitting section is disposed at positions where the light irradiated from said light emitting section does not enter directly to said image capture section.

4. The image capture module according to claim 1, comprising:

said light emitting section comprising at least one light emitting element; and at least one light reflecting element, mounted around said light emitting element, configured to irradiate the light emitted from said light emitting element within an object image capture range by said light reflecting element.

5. The image capture module according to claim 1, further comprising:

a protection device, mounted in front of at least one of said light emitting section and said image capture section, configured to protect said at least one of said light emitting section and said image capture section.

6. The image capture module according to claim 1, further comprising:

a filtering device which has a wavelength selectivity which passes light of a predetermined wavelength.

7. The image capture module according to claim 1, further comprising a casing which houses the whole of said light emitting section and said image capture section.

8. The image capture module according to claim 7, wherein said casing has a connector configured to exchange signals with an internal circuit of said image capture section.

9. The image capture module according to claim 8, further comprising a rotary shaft mounted to said image capture module and configured for rotatable movement of said image capture module.

10. The image capture module according to claim 9, wherein said connector is disposed in close vicinity to said rotary shaft.

11. An image capture module for inputting a shape of an object on a three-dimensional space, comprising:
   a light emitting section configured to irradiate light to the object to be imaged;
   an image capturing section disposed in the vicinity of said light emitting section and configured to detect the light emitted by said light emitting section and reflected by said object, comprising,
      a photo-electric converter section which converts incident light into electric charge,
      a first charge accumulating section which accumulates the electric charge during a light emission of the light emitting section,
      a second charge accumulating section which accumulates the electric charge while the light emitting section does not emit the light, and
      a differential circuit which takes out a difference between the electric charges accumulated in the first and second accumulating sections; and
   wherein said light emitting section has a directivity that illuminates a peripheral part of an image capture range more brightly than a center of the image capture range, the light emitting section includes an LED chip and a concealing resin, and the directivity is given by changing a lens effect of the concealing resin.

12. The image capture module according to claim 11, wherein said light emitting section is disposed geometrically symmetrically around said image capture section.

13. The image capture module according to claim 11, wherein said light emitting section is disposed at positions where the light irradiated from said light emitting section does not enter directly to said image capture section.

14. The image capture module according to claim 11, comprising:
   said light emitting section comprising at least one light emitting element; and
   at least one light reflecting element, mounted around said light emitting element, configured to irradiate the light emitted from said light emitting element within an object image capture range by said light reflecting element.

15. The image capture module according to claim 11, further comprising:
   a protection device, mounted in front of at least one of said light emitting section and said image capture section, configured to protect said at least one of said light emitting section and said image capture section.

16. The image capture module according to claim 11, further comprising:
   a filtering device which has a wavelength selectivity which passes light of a predetermined wavelength.

17. The image capture module according to claim 11, further comprising a casing which houses the whole of said light emitting section and said image capture section.

18. The image capture module according to claim 17, wherein said casing has a connector configured to exchange signals with an internal circuit of said image capture section.

19. The image capture module according to claim 18, further comprising a rotary shaft mounted to said image capture module and configured for rotatable movement of said image capture module.

20. The image capture module according to claim 19, wherein said connector is disposed in close vicinity to said rotary shaft.

21. An image capture apparatus for inputting a shape of an object on a three-dimensional space, comprising:
   an image capture module, comprising,
      a light emitting section configured to irradiate light to an object to be imaged;
      an image capture section, disposed in a vicinity of said light emitting section and configured to detect light emitted from said light emitting section and reflected by said object; and
      a mechanism configured to move said image capture module within a predetermined range of an angle of elevation;
   wherein the image capturing section comprises a reflected light image detecting section which takes out the reflected light of the object from external light; and
   wherein said light emitting section has a directivity that illuminates a range wider than an image capture range and illuminates a peripheral part of the image capture range more brightly than a center of the image capture range, the light emitting section includes an LED chip and a concealing resin, and the directivity is given by changing a lens effect of the concealing resin.

22. The image capture apparatus according to claim 21, further comprising:
   handles attached to said image capture module and configured to move said image capture module.

23. The image capture apparatus according to claim 21, further comprising a casing configured to conceal and store an external circuit of aid image capture module.

24. An image capture apparatus for inputting a shape of an object on a three-dimensional space, comprising:
   an image capture module, comprising,
      a light emitting section configured to irradiate light to an object to be imaged;
      an image capture section, disposed in a vicinity of said light emitting section and configured to detect light emitted from said light emitting section and reflected by said object; and
      a mechanism configured to move said image capture module within a predetermined range of an angle of elevation;
   wherein the image capturing section comprises a reflected light image detecting section which takes out the reflected light of the object from external light; and
   wherein said light emitting section has a directivity that illuminates a peripheral part of an image capture range more brightly than a center of the image capture range, the light emitting section includes an LED chip and a concealing resin, and the directivity is given by changing a lens effect of the concealing resin.

25. The image capture apparatus according to claim 24, further comprising:
   handles attached to said image capture module and configured to move said image capture module.

26. The image capture apparatus according to claim 24, further comprising a casing configured to conceal and store an external circuit of aid image capture module.

* * * * *